United States Patent
Rao et al.

(10) Patent No.: US 7,046,167 B2
(45) Date of Patent: May 16, 2006

(54) ADAPTIVE COLLISION LOAD PATH MODIFICATION SYSTEM FOR VEHICLE COLLISION COMPATIBILITY

(75) Inventors: Manoharprasad K. Rao, Novi, MI (US); Kwaku O. Prakah-Asante, Commerce Township, MI (US); Gary S. Strumolo, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 10/707,330

(22) Filed: Dec. 5, 2003

(65) Prior Publication Data

US 2004/0117086 A1    Jun. 17, 2004

Related U.S. Application Data

(60) Provisional application No. 60/432,973, filed on Dec. 13, 2002.

(51) Int. Cl.
*B60R 21/235* (2006.01)
*B60R 20/13* (2006.01)

(52) U.S. Cl. ............ 340/903; 340/435; 340/436; 342/72; 180/271; 280/741; 280/784; 701/45; 701/301

(58) Field of Classification Search ............ 340/901, 340/903, 435, 436; 342/72, 455; 701/45, 701/301; 180/232, 271, 274, 281, 282; 280/741, 280/742, 784, 736, 752, 751; 188/267.1, 188/267.2
See application file for complete search history.

(56) References Cited

U.S. PATENT DOCUMENTS

| 3,871,471 A | * | 3/1975 | Wong ............ 180/271 |
| 4,399,887 A | * | 8/1983 | Okada ............ 180/282 |
| 5,482,322 A | * | 1/1996 | Wheatley et al. ........... 280/784 |
| 5,623,246 A | * | 4/1997 | Kruse et al. ............ 340/438 |
| 5,646,613 A |   | 7/1997 | Cho |
| 6,036,226 A | * | 3/2000 | Brown et al. ............ 280/736 |
| 6,106,038 A |   | 8/2000 | Dreher |

(Continued)

FOREIGN PATENT DOCUMENTS

WO    WO 02/094618 A1    11/2002

OTHER PUBLICATIONS

Brown, Arvelo, and Strong, "Investigation of the Major Factors Influencing Front Compatibility Design of Vehicles", Society of Automotive Engineers, Inc., 2001, 2001-01-1166, pp. 53-61.

*Primary Examiner*—Jeffery Hofsass
*Assistant Examiner*—Anne V. Lai
(74) *Attorney, Agent, or Firm*—Frank A. MacKenzie

(57) ABSTRACT

An adaptive collision load path modification system (10) for a vehicle (12) includes multiple object detection sensors (14) that generate object detection signals. The system (10) may include a structural stiffness-adjusting device (46), which is coupled within a frame rail (58, 62) of the vehicle (12), and in addition or alternatively a tire deflation apparatus (48). A controller (18) is coupled to the object detection sensors (14) and through use of the structural stiffness-adjusting device (46) or the tire deflation apparatus (48) adjusts collision load paths of the vehicle (12) in response to the object detection signals. In so doing, the controller (18) may activate the structural stiffness-adjusting device (46) and deflate a tire (76) of the vehicle (12).

20 Claims, 2 Drawing Sheets

U.S. PATENT DOCUMENTS

| | | | |
|---|---|---|---|
| 6,290,019 B1 * | 9/2001 | Kolassa et al. | 180/282 |
| 6,343,810 B1 * | 2/2002 | Breed | 280/730.2 |
| 6,480,144 B1 * | 11/2002 | Miller et al. | 342/72 |
| 6,519,519 B1 * | 2/2003 | Stopczynski | 701/45 |
| 6,560,520 B1 * | 5/2003 | Yokota et al. | 701/45 |
| 6,786,508 B1 * | 9/2004 | Fraley et al. | 280/751 |
| 6,789,820 B1 * | 9/2004 | Meduvsky et al. | 280/742 |
| 6,854,553 B1 * | 2/2005 | Sovoda et al. | 180/274 |

* cited by examiner

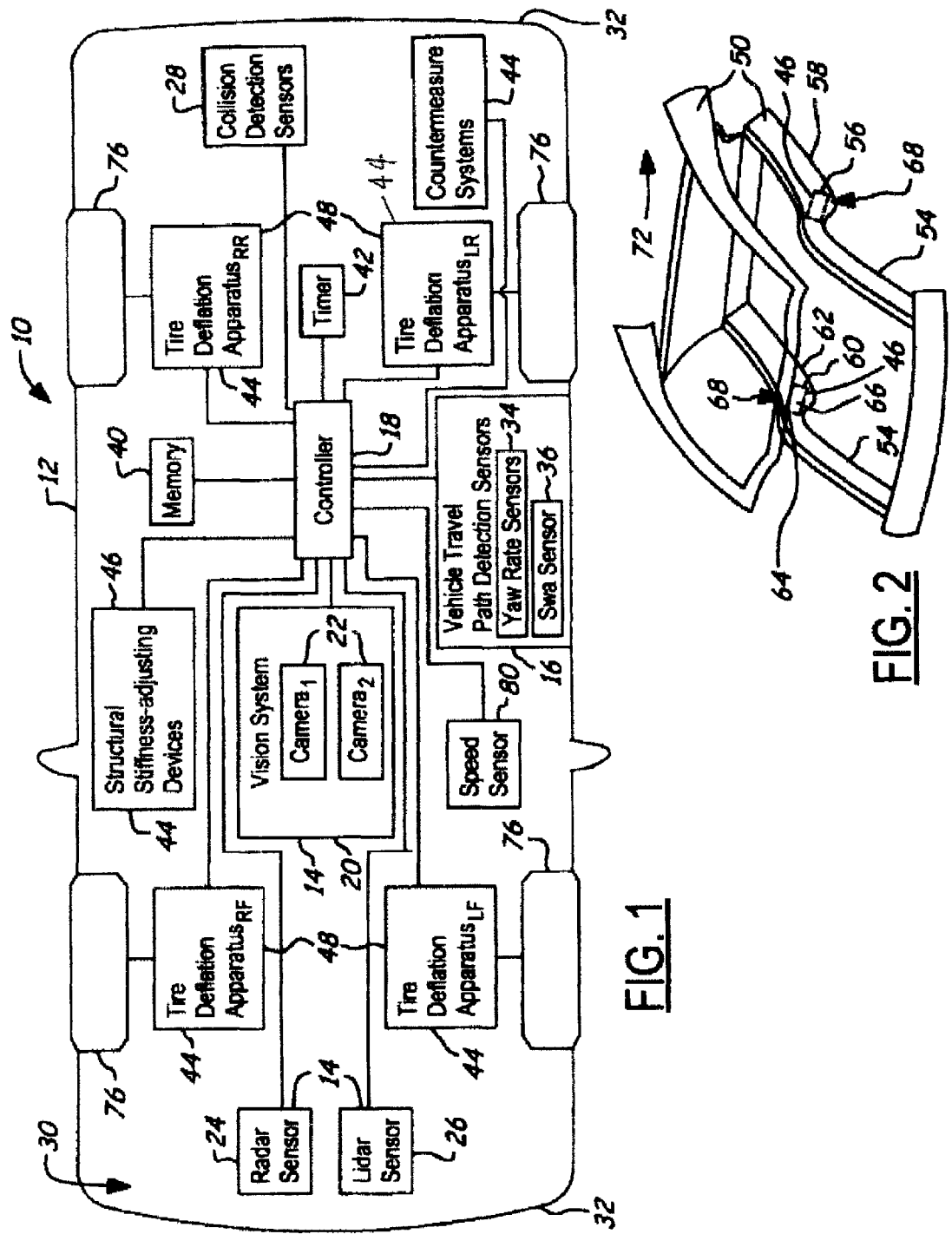

ADAPTIVE COLLISION LOAD PATH MODIFICATION SYSTEM FOR VEHICLE COLLISION COMPATIBILITY

The present invention claims priority from U.S. Provisional Application Ser. No. 60/432,973, entitled "Adaptive Stiffness for Vehicle Compatibility in Frontal Crashes", filed Dec. 13, 2002.

BACKGROUND OF INVENTION

The present invention relates generally to collision detection systems and countermeasure systems. More particularly, the present invention relates to a system and method of adaptively adjusting collision load paths of a vehicle for vehicle collision compatibility during a collision event.

Various sensing systems currently exist for performing collision detection and countermeasure system operations. These operations can include collision and object detection, as well as object classification, tracking, and relative distance and velocity estimation. The stated operations may also include the rotation of vehicle wheels or collapsing of a steering system to adjust vehicle stiffness during a collision event.

Collision detection, warning, and countermeasure systems exist in various passive and active forms. Some countermeasure systems are used to aid in the prevention of a collision, others are used to aid in the prevention of injury to a vehicle operator. The countermeasure systems may provide a vehicle operator knowledge and awareness of vehicles and objects that are within a close proximity of the host vehicle to prevent colliding with those objects. The countermeasure systems may activate various restraint systems. The countermeasure systems may also adjust vehicle stiffness in order to modify the amount of energy absorbed during a collision and thus prevent or mitigate an injury to a vehicle occupant.

In vehicle frontal collisions, vehicle occupant injuries depend upon a number of factors, such as the mass, stiffness, velocity, and heading, of the host vehicle and the object collided therewith, as well as the effectiveness of any occupant restraint systems. Whether the object being collided with is for example, a large rigid object, a small deformable object, a pole, a pedestrian, an animal, a motorcycle, or other object has a significant affect on the occurrence and degree of occupant injury. When the host vehicle is involved in a head-on collision with an object, the collision type, namely whether the collision is a full overlap or a partial overlap collision, also has a significant effect on the nature and magnitude of the occupant injuries.

Front-end vehicle structures and occupant restraint systems are generally developed to provide optimum protection to the vehicle occupants under a number of different scenarios. The vehicle structures and the restraint systems are designed and tuned to provide protection for unbelted occupants at low speeds and for belted occupants at high speeds. Also, the vehicle structures and restraint systems are developed to provide effective occupant protection under angular and offset collisions. Offset collisions may involve different overlaps with both rigid and deformable objects.

Currently, a vehicle front structure is designed to have a particular stiffness. The term "vehicle front structure" refers to the portion of the vehicle forward of the occupant compartment. This stiffness exists independently of the traveling speed of the vehicle and the relative speed of the object collided therewith, as well as the type of object involved in the collision and the collision type.

In general, increased front structure stiffness results in higher energy absorption at higher collision velocities, and consequently results in lower occupant injury numbers, such as lower head injury criterion (HIC)s numbers and chest deceleration values. Although an increase in structural stiffness can improve energy absorption during high velocity collisions, an increase in structural stiffness can result in uncollapsable structures at low speeds. The inability of the structures to collapse at low speeds can result in the transfer of increased forces to the occupant compartment and thus the vehicle occupants.

Current collision detection, warning, and countermeasure systems are limited in their ability to adjust stiffness of a host vehicle front structure and are incapable of accounting for various host vehicle and object traveling speeds, object types, and collision types. Thus, there exists a need for an improved collision detection and countermeasure system that provides improved stiffness compatibility for various collision event situations and conditions.

SUMMARY OF INVENTION

The present invention provides an adaptive collision load path modification system for a vehicle. The system includes multiple object detection sensors that generate object detection signals. The system may include a structural stiffness-adjusting device, which is coupled within a frame rail of the vehicle, and in addition or alternatively a tire deflation apparatus. A controller is coupled to the object detection sensors and through use of the structural stiffness-adjusting device or the tire deflation apparatus adjusts collision load paths of the vehicle in response to the object detection signals. In so doing, the controller may activate the structural stiffness-adjusting device and deflate a tire of the vehicle.

The embodiments of the present invention provide several advantages. One such advantage is the provision of a collision load path modification system that includes a structural stiffness-adjusting device, which when activated increases the stiffness of a frame rail, thereby altering the collision load levels and collision load paths. In so doing, the stated embodiment minimizes intrusion into a vehicle occupant compartment and injury to vehicle occupants therein.

Another advantage provided by an embodiment of the present invention is the provision of a collision load path modification system that includes a tire deflation apparatus that may be used to selectively deflate tires of a vehicle, thus also modifying collision load paths of the vehicle during a collision event. The stated embodiment also aids in the minimization of intrusion into a vehicle occupant compartment and injury to vehicle occupants.

Furthermore the combinative use of the above stated embodiments provides increased control of load path routing during a collision event.

Moreover, the present invention provides collision threat assessment and countermeasure capabilities for improved load path routing performance during a collision event including timing, activation, and deflation, of system devices.

The present invention itself, together with attendant advantages, will be best understood by reference to the following detailed description, taken in conjunction with the accompanying figures.

BRIEF DESCRIPTION OF DRAWINGS

For a more complete understanding of this invention reference should now be had to the embodiments illustrated in greater detail in the accompanying figures and described below by way of examples of the invention wherein:

FIG. 1 is a block diagrammatic view of an adaptive collision load path modification system for a vehicle in accordance with an embodiment of the present invention;

FIG. 2 is a perspective view of a vehicle front structure having structural stiffness-adjusting devices within frame rails of the vehicle in accordance with an embodiment of the present invention.

DETAILED DESCRIPTION

Figure 3:
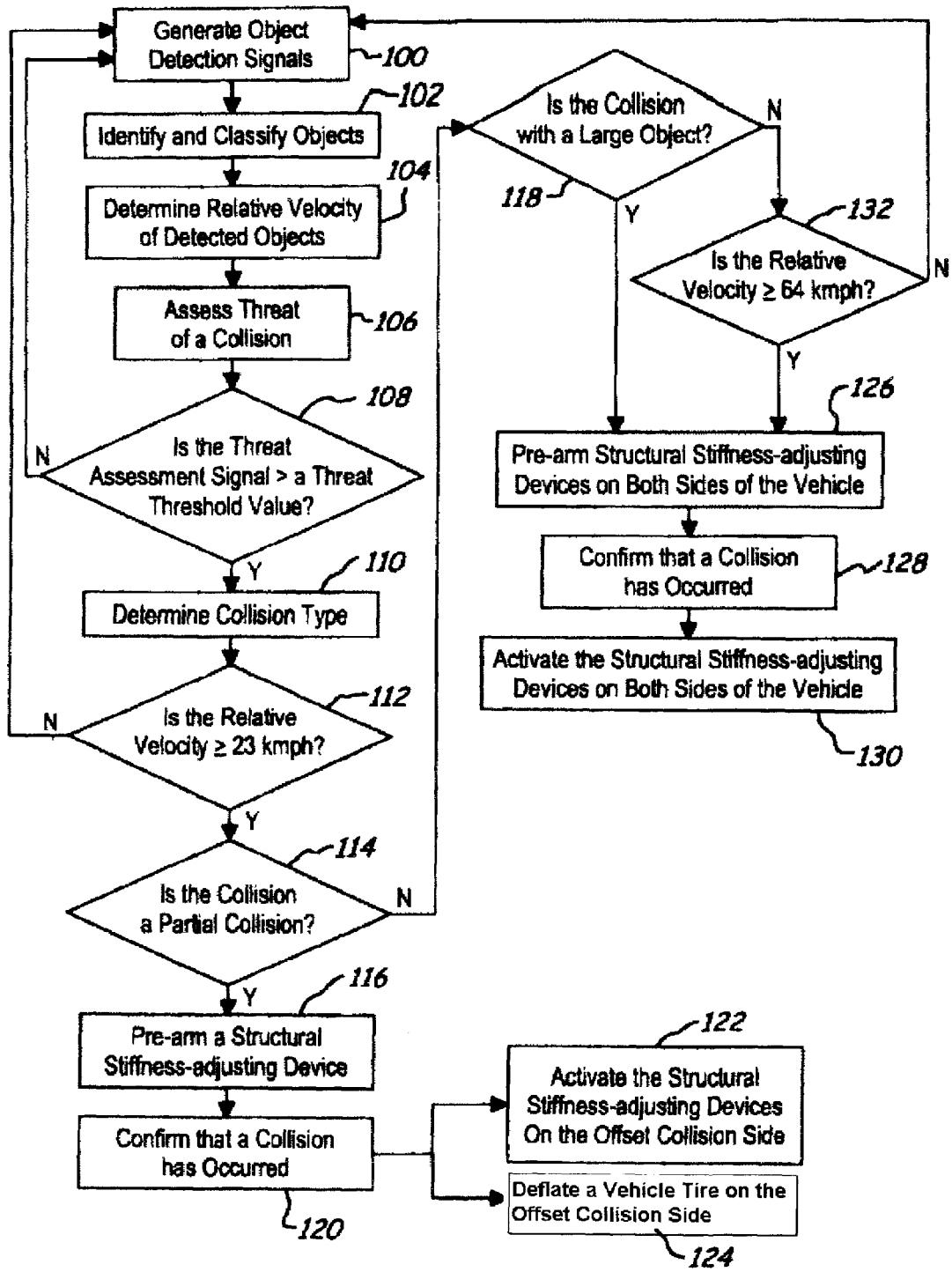
FIG. 3 is a logic flow diagram illustrating a method of modifying collision load paths of the vehicle during a collision event in accordance with an embodiment of the present invention.

In the following figures, the same reference numerals will be used to refer to the same components. While the present invention is described with respect to a system and method of modifying collision load paths of a vehicle, the present invention may be adapted to be used in various applications and systems including: countermeasure systems, vehicle systems, or other systems known in the art. The present invention may be used in conjunction with, may be supplemental to, or may be an integral part of various safety and countermeasure systems known in the art. The present invention may share components of existing safety systems and operate dependently or independently therefrom.

In the following description, various operating parameters and components are described for one constructed embodiment. These specific parameters and components are included as examples and are not meant to be limiting.

Also, in the following description the term "performing" may include activating, deploying, initiating, powering, and other actions known in the art that may describe the manner in which a countermeasure may be operated.

Additionally, in the following description the term "countermeasure" may refer to an object or may refer to an action. For example, a countermeasure may be performed or a countermeasure may be activated. An airbag is a countermeasure. A controller may perform a countermeasure by signaling the airbag to deploy.

Moreover, a countermeasure device may be any device within an automotive vehicle that is used in conjunction with a collision countermeasure system including: a controller, a vehicle system, an indicator, or other countermeasure device known in the art.

In addition, the term "collision type" refers to collision severity and collision contact location of a collision. Collision type may include whether a collision is a partial overlap, frontal, oblique, side, rear, or head-on collision, as well as refer to other collision location type descriptions known in the art. A collision type may also include information related to relative size, weight, speed, and heading of a collision object, as well as other collision type related information known in the art.

Referring now to FIG. 1, a block diagrammatic view of an adaptive collision load path modification system 10 for a host vehicle 12 in accordance with an embodiment of the present invention is shown. The system 10 includes multiple object detection sensors 14, vehicle travel path detection sensors 16, a controller 18, and various other countermeasure system devices, some of which are stated below.

The object detection sensors 14 are used in the detection of objects, the detection of a collision, the assessment of a collision, the determination of the severity and collision contact location of a collision, and the determination of a collision type. The object detection sensors 14 generate object detection signals, which may include object parameter information related to relative speed, heading, location, weight, and size of objects in a close or proximate vicinity of the vehicle. The object detection sensors 14 may include a vision system 20 having vision sensors, such as cameras 22, as well as radar sensors 24 (only one is shown), lidar sensors 26 (only one is shown), and other object detection sensors known in the art.

In one embodiment of the present invention, the object detection sensors 14 include a vision system supplemented with a radar sensor or a lidar sensor for improved performance during adverse weather conditions. The vision system 20 may be located behind the rearview mirror in the passenger compartment of the vehicle 12. The radar sensors 24 and lidar sensors 26 may be located near a front bumper of the vehicle 12.

The object detection sensors 14 may include collision detection sensors 28, such as accelerometers and contact sensors. When contact or patch like sensors are utilized, the collision sensors 28 may generate collision detection signals in response to the force exerted across the surface area of each sensor 28. The collision sensors 28 may be in the form of discretized patch sensors or the like. Patch sensors provide a surface area of contact for collision detection as opposed to accelerometers that provide single point detection.

The path detection sensors 16 are used to determine the path at a current moment in time and may be used to estimate a future vehicle path or road curvature. The path detection sensors 16 may include one or more yaw rate sensors 34 and a steering wheel angle (SWA) sensor 36, as shown, as well as other vehicle travel path detection sensors known in the art.

The controller 18 monitors the object detection sensors 14, the path detection sensors 16, the collision detection sensors 28, and assesses threat of a collision and determines collision severity and collision contact location. The controller 18 may perform countermeasures in response to the collision threat, the collision severity, and the collision contact location.

The controller 18 is not only coupled to the object detection sensors 14, the path detection sensors 16 and the collision detection sensors 28, but is also coupled to a memory 40, a timer 42, and various countermeasure devices 44. The controller 18 may be microprocessor based such as a computer having a central processing unit, memory (RAM and/or ROM), and associated input and output buses. The controller 18 may be in the form of an application-specific integrated circuit or may be formed of other logic devices known in the art. The controller 18 may be a portion of a central vehicle main control unit, an interactive vehicle dynamics module, a main safety controller, a restraints control module, or may be a stand-alone controller as shown. Each of the tire deflation apparatuses 48 have a subscript designator based on their location within the vehicle 12.

The controller 18 is coupled to multiple countermeasure systems and devices 44. The countermeasure systems and devices 44 may be active or passive in nature. In multiple embodiments of the present invention, the controller 18 is coupled to structural stiffness-adjusting devices 46 and tire deflation apparatuses 48.

Referring now to FIG. 2, a perspective view of a vehicle front structure 50 having a pair of stiffness-adjusting devices 46 coupled within a pair of frame rails 54 of the vehicle 12 is shown in accordance with an embodiment of the present invention. A first stiffness-adjusting device 56 is located within a left frame rail 58 and a second stiffness-adjusting device 60 is located in a right frame rail 62. The first stiffness-adjusting device 56 is in the form of an air bag. The second stiffness-adjusting device 60 is in the form of a magneto-rheological device having an outer housing 64 at least partially filled with a magneto-rheological material 66. Properties of a magneto-rheological device change when a magnetic field is applied to the material contained therein. The stiffness-adjusting devices 46 although shown in the form of an air bag, a magneto-rheological device, may be in some other form having similar properties such that they are capable of quickly varying in stiffness. Also, any combination of stiffness-adjusting devices may be utilized.

The stiffness-adjusting devices 46, although shown as being coupled within frame rail kick-up areas 68 of the structure 50, between a front suspension 70 (not shown) and a vehicle occupant compartment 72, may be located in various other frame rail locations. The term "frame rail" refers to a structural supporting member having a cross-sectional perimeter that surrounds the stiffness-adjusting device, such as a tubular frame section having a rectangular or other cross-sectional shape. The frame rails 58 and 62 do not need to fully encase the stiffness-adjusting devices 46, but yet they do sufficiently enclose the stiffness-adjusting devices 46 such that bending stiffness of the frame rails 58 and 62 can be altered during a collision event.

Referring again to FIG. 1, the tire deflation apparatuses 48 may be in the form of pyrotechnic elements or other devices, which allow for quick deflation of one or more tires 76 of the vehicle 12. During a collision event the controller 18 may deflate one or more of the tires 76 through use of the deflation apparatuses 48 in order to modify load paths of a collision. The tire deflation apparatuses 48 may be located within close proximity of the tires 76, such as in an axel or wheel or tire valve, or may be in other various locations on the vehicle 12.

The countermeasure systems 44 may also include other air bags, seat belt restraint systems, belt pretensioners, load limiting seat belts, steering control, brake control, and various other passive and active countermeasures known in the art.

The controller 18 is also coupled to a speed sensor 80. The speed sensor 80 generates a speed signal indicative of the traveling speed of the vehicle 12.

Referring now also to FIG. 3, a method of modifying collision load paths of the vehicle 12 during a collision event in accordance with an embodiment of the present invention is shown.

In step 100, the controller 18 monitors the object detection signals received from the object detection sensors 14. In step 102, the controller 18 identifies objects within a close proximity of the vehicle 12 and classifies the objects. The classification may include information from the above-mentioned object parameters. The object classes may include heavy trucks, light trucks, sport utility vehicles, passenger vehicles, motorcycles, pedestrians, poles, or other classes known in the art.

In step 104, the controller 18 determines the relative velocity of the detected objects. The radar sensor 24, the lidar sensor 26, or the vision system 20 may be used to determine the relative velocity of the detected objects. The relative velocity of the detected objects may be used for collision threat assessment.

In step 106, the controller 18 assesses the threat of a collision in response to the classification of each object. The controller 18 determines whether a potential collision may occur. The controller 18 determines whether the objects are a threat and the level of the threat based on the relative size, speed, heading, weight, and location of each object. The controller 18 generates a threat assessment signal in response to the determined threat level of each object.

In step 108, the controller 18 compares the threat assessment signal with threat threshold values. When the threat assessment signal exceeds a threat threshold value the controller 18 performs step 110, otherwise the controller 18 returns to step 100.

In step 110, the controller 18 determines the collision type in response to the object parameters and the collision threat assessment. The collision type may include any and all of the previously stated information related to collision type. The controller in determining collision type, determines whether the collision is a full frontal collision, a partial frontal collision, or other type of collision.

In step 112, the controller 18 determines whether the relative velocity determined in step 104 is greater than or equal to approximately 23 kilometers per hour (kmph). When the relative velocity is greater than or equal to 23 kmph the controller 18 proceeds to step 114, otherwise the controller returns to step 100.

In step 114, the controller 18 determines whether the future potential collision is a partial frontal collision. In one embodiment of the present invention, when the collision is a partial frontal collision the controller 18 proceeds to step 116, otherwise the controller performs step 118.

In step 116, the controller 18 pre-arms one or more of the stiffness-adjusting devices 46 for actuation. In step 120, the controller 18 verifies that a collision has occurred via the collision detection sensors 28. The collision sensors 28 generate the collision detection signals indicative of whether a collision has occurred. Upon completion of step 120 the controller 18 may perform step 122, step 124, or a combination thereof.

In step 122, the controller 18 activates one or more of the stiffness-adjusting devices 46. In the above example embodiment when the collision is a partial frontal collision, the controller 18 activates the stiffness-adjusting device that is on the collision side of the vehicle 12. The collision side of the vehicle may refer to the left-side or the right-side in the front or in the rear of the vehicle, or a combination thereof. In step 124, the controller 18 deflates one or more of the vehicle tires 76 through use of the tire deflation apparatuses 48.

In step 118, the controller 18 determines whether the object of concern is a large object, such as a large truck or sport utility vehicle. In step 126, when the object of concern is a large object, the controller 18 pre-arms the stiffness-adjusting devices 46. In step 128, the controller 18 confirms a collision has occurred via the collision detection sensors 28, as described above. In step 130, the controller 18 activates the stiffness-adjusting devices 46 on both sides of the vehicle 12.

When the object of concern is not a large object, the controller 18 performs step 132. In step 132, the controller 18 determines whether the relative velocity is approximately greater than or equal to 64 kmph. When the relative velocity is greater than or equal to 64 kmph steps 126, 128, and 130 are performed, otherwise the controller 18 returns to step 100.

The above-described steps are meant to be illustrative examples; the steps may be performed sequentially, synchronously, simultaneously, or in a different order depending upon the application. Also, although the above-described method steps address structural stiffness modification, method steps may also include those that address performance of other countermeasures systems and devices.

The present invention provides an adaptive collision load path modification system that minimizes intrusion into a vehicle occupant compartment of a vehicle. The present invention provides capability for adjusting stiffness of a vehicle structure and deflation of vehicle tires in the event of a collision. The present invention accurately modifies the load paths of a vehicle through assessment of a collision prior and during a collision event.

The present invention provides improved collision assessment for improved safety system and countermeasure performance.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

The invention claimed is:

1. An adaptive collision load path modification system for a vehicle comprising:
   a plurality of object detection sensors generating object detection signals in response to at least one object external to the vehicle;
   at least one structural stiffness-adjusting device coupled within a frame rail of the vehicle; and
   a controller coupled to said plurality of object detection sensors and said structural stiffness-adjusting device and activating said at least one structural stiffness-adjusting device in response to said object detection signals;
   wherein said at least one structural stiffness-adjusting device comprises an outer body at least partially filled with a magneto-rheological material that stiffens said frame rail when activated to increase alteration resistance of said frame rail as a result of colliding with said at least one object.

2. A system as in claim 1 wherein said object detection signals comprise collision detection information.

3. A system as in claim 1 further comprising contact sensors generating collision detection signals, said controller activating said at least one structural stiffness-adjusting device in response to said collision detection signals.

4. A system as in claim 3 wherein said contact sensors are selected from at least one of a discretized patch sensor and an accelerometer.

5. A system as in claim 1 wherein said object detection sensors are selected from at least one of a vision sensor, a radar sensor, a lidar sensor, and a contact sensor.

6. A system as in claim 1 wherein said at least one structural stiffness-adjusting device comprises at least one air bag.

7. A system as in claim 1 wherein said at least one structural stiffness-adjusting device is coupled within a frame rail kick-up area.

8. A system as in claim 1 wherein said at least one structural stiffness-adjusting device is coupled within a front rail between a front suspension attachment points and an occupant compartment of the vehicle.

9. A system as in claim 1 further comprising at least one tire deflation apparatus coupled to said controller, said controller activating said at least one tire deflation apparatus to at least partially deflate at least one tire on the vehicle in response to said object detection signals.

10. A system as in claim 1 wherein said at least one structural stiffness-adjusting device comprises:
    a first structural stiffness-adjusting device coupled within a left frame rail of the vehicle; and
    a second structural stiffness-adjusting device coupled within a right frame rail of the vehicle;
    said controller activating at least one of said first structural stiffness-adjusting device and said second structural stiffness-adjusting device in response to said object detection signals.

11. An adaptive collision load path modification system for a vehicle comprising:
    a plurality of object detection sensors generating object detection signals;
    at least one tire deflation apparatus; and
    an electronic controller coupled to said plurality of object detection sensors and said tire deflation apparatus and activating said at least one tire deflation apparatus to at least partially deflate at least one tire on the vehicle in response to said object detection signals in order to modify load paths of a collision.

12. A system as in claim 11 wherein said controller activates said at least one tire deflation apparatus in response to at least one collision object parameter selected from speed, heading, size, weight, and location, relative to the vehicle.

13. A system as in claim 11 further comprising a structural stiffness-adjusting device coupled to said controller and within a frame rail of the vehicle, said controller activating said structural stiffness-adjusting device in response to said object detection signals.

14. A system as in claim 11 wherein said at least one tire deflation apparatus comprises:
    a first tire deflation apparatus coupled to a left tire of the vehicle; and
    a second tire deflation apparatus coupled to a right tire of the vehicle;
    said controller activating at least one of said first tire deflation apparatus and said second tire deflation apparatus in response to said objed detection signals.

15. A system as in claim 11 wherein said controller activates said at least one tire deflation apparatus in response to detection of a collision.

16. A method of modifying collision load paths of a vehicle comprising:
    generating object detection signals in response to at least one object external from the vehicle;
    determining at least one object parameter comprising at least one of object size and object weight in response to said object detection signals; and
    activating at least one structural stiffness-adjusting device within a frame rail of the vehicle to increase resistance of said frame rail in response to said at least one object parameter.

17. A method as in claim 16 further comprising at least partially deflating at least one tire on the vehicle.

18. A method as in claim 16 further comprising:
classifying at least one object;
determining velocity of said at least one objed relative to the vehicle;
determining heading of said at least one object relative to the vehicle;
determining collision type in response to said heading;
assessing collision threat in response to said velocity and said collision type; and
activating at least one structural stiffness-adjusting device in response to said collision threat.

19. A method as in claim 16 wherein activating at least one structural stiffness-adjusting device comprises modifying a collision load path within at least one side of the vehicle.

20. A system as in claim 11 wherein said controller deflates said at least one tire on a single side of the vehicle.

* * * * *